Aug. 27, 1940. D. E. WARFEL 2,213,153
POULTRY FEEDER
Filed July 24, 1939 2 Sheets-Sheet 1
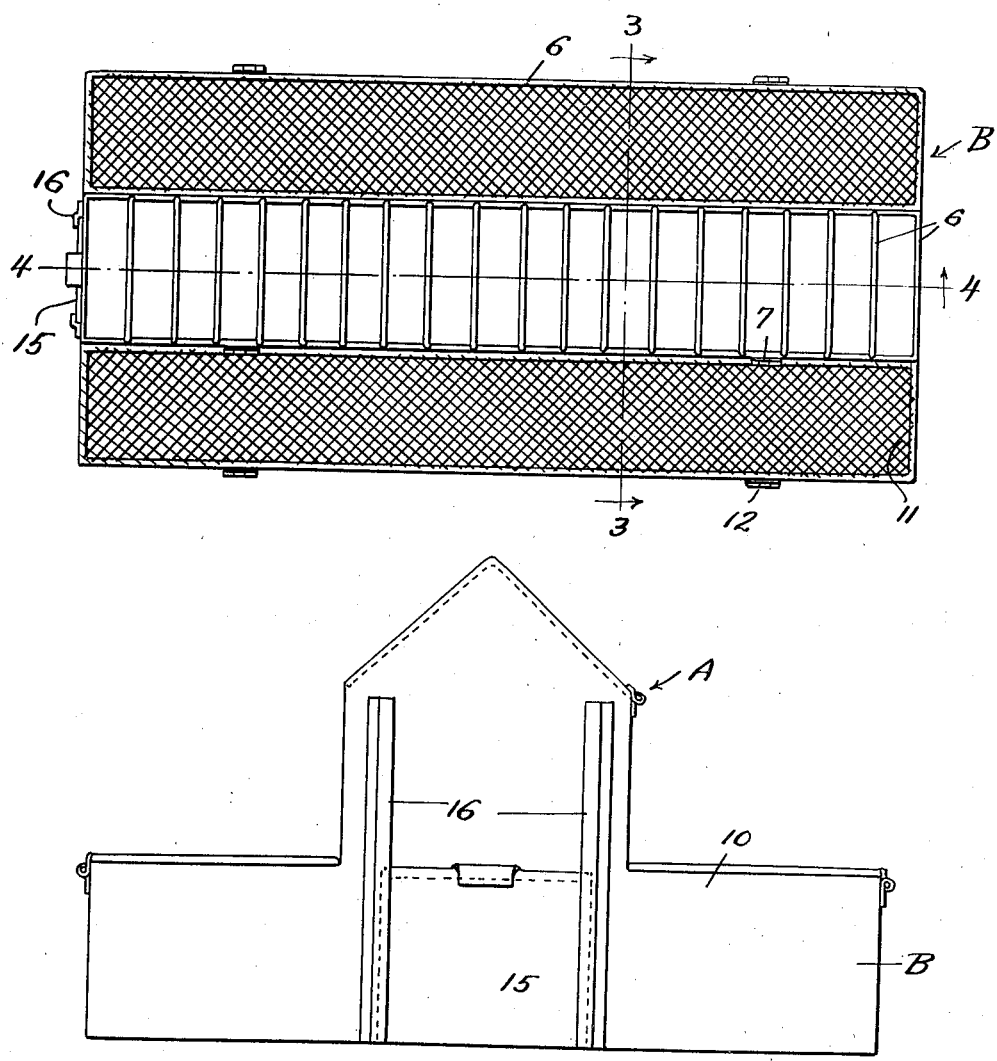
Inventor
Dora E. Warfel
By Clarence A. O'Brien
and Hyman Berman
Attorneys

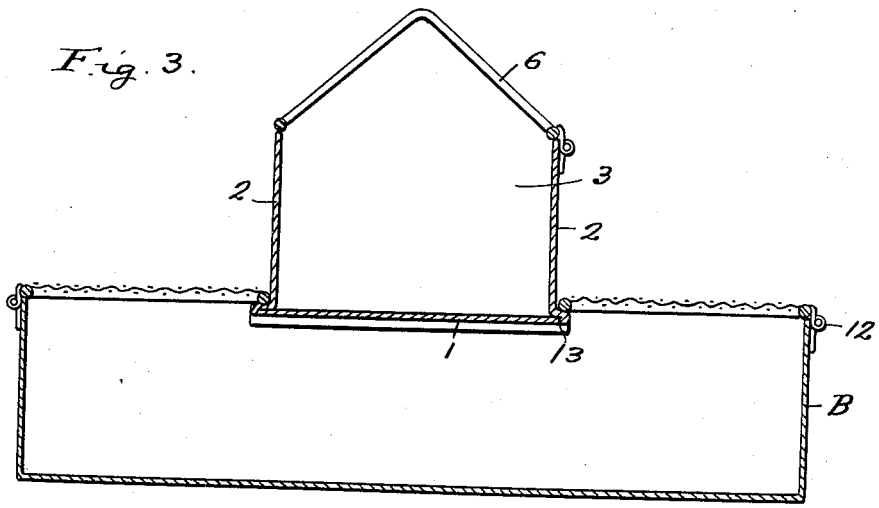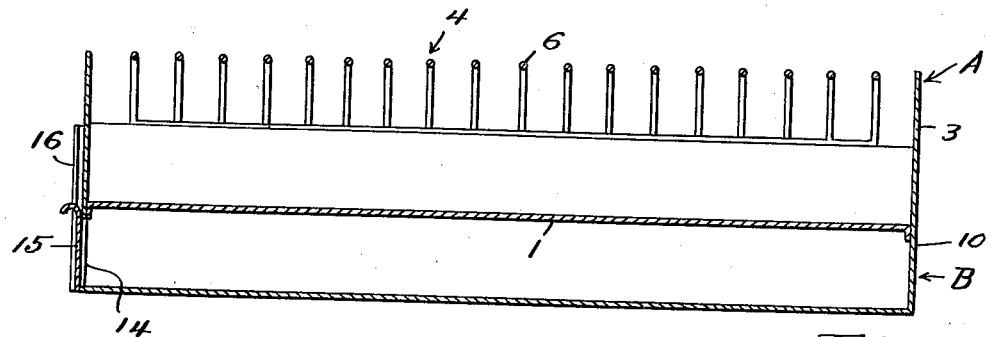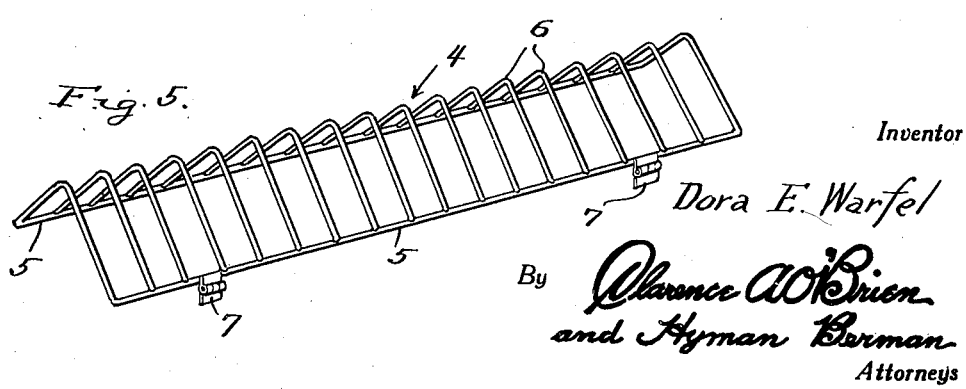

Patented Aug. 27, 1940

2,213,153

UNITED STATES PATENT OFFICE 2,213,153

POULTRY FEEDER

Dora E. Warfel, Conestoga, Pa.

Application July 24, 1939, Serial No. 286,262

1 Claim. (Cl. 119—61)

This invention relates to a poultry feeder, mainly designed for chicks, the general object of the invention being to provide a chamber for use with a feeder proper for catching the feed which is pulled from the feeder by the chicks and usually wasted.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a top plan view of the invention.

Figure 2 is an end view thereof.

Figure 3 is a section on the line 3—3 of Figure 1.

Figure 4 is a section on the line 4—4 of Figure 1.

Figure 5 is a perspective view of the cover for the feeder proper.

In these views the letter A indicates the feeder proper, this feeder comprising the bottom 1, the two sides 2, the two ends 3 having their upper ends peaked and the cover 4 which is of inverted V-shape in cross section and composed of the side bars 5 and the right angular bars 6 having their ends connected with the side bars 5 to provide an open work structure which extends over the top of the feeder structure. One of the bars 5 is connected to one of the side members 2 by the hinges 7 and latch means can be provided for connecting the other bar 5 to the opposite side if desired. This feeder is practically the same as feeders now in use, it being understood that the feed is dropped into the housing by raising the cover 4 and the chicks poke their heads through the spaces between the bars 6 to secure the feed and it is well understood that the chicks will withdraw their heads from said spaces and drop quite a bit of this feed upon the ground were it is wasted.

It is the object of my invention to save this feed and in carrying out my invention I provide a large casing B, said casing being of substantially the same length as that of the casing of the feeder and of substantially three times the width of the width of the feeder. The end pieces 3 of the feeder may be formed integrally with the end pieces 10 of the casing B or if the feeder is already formed then said feeder can have its end pieces rest on the central portion of the end pieces of the casing. The drawings show the feeder as forming an integral part of the casing. Of course, the central portion of the top of the casing is closed by the bottom 1 of the feeder but the parts of the top at the sides of the feeder are open but are adapted to be covered by the screen carrying frames 11 which are hingedly connected to the sides of the casing as shown at 12 so that each frame can be swung upwardly and outwardly to provide access to the casing but when in closed position the inner side edge of each frame 11 rests on a flange 13 formed at each side of the feeder at the bottom thereof as clearly shown in Figure 3. Of course, any feed pulled from the feeder by the chicks will drop through the screens of the frames 11 into the casing B so that this feed will be saved. In order to provide simple means for removing this feed from the casing I provide an opening 14 in one end of the casing which is adapted to be closed by the door 15 slidably supported by the vertical guideways 16 attached to the end piece of the casing and an end piece of the feeder, as shown in Figure 2.

Thus it will be seen that I have provided simple means for saving the feed from a feeder which is ordinarily lost. It will, of course, be understood that the chicks stand on the screens of the frame 11 in taking the feed from the feeder so that any feed dropped by the chicks will be passed through the screen into the casing from which it can be removed by opening the door 15.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A poultry feeder comprising a casing including a bottom, side and end walls and an open top, a bottom forming plate extending longitudinally across the middle of the top of the casing with its ends connected with the end walls and said plate leaving openings between its side edges and the upper edges of the side walls of the casing, side walls extending upwardly from the side edges of said plate and spaced slightly inwardly from the side edges thereof to form ledges, the end walls of the casing having upwardly extending extensions on the middle portions forming end walls for the space formed by the side walls extending upwardly from the plate, said upwardly extending side walls and the extension end walls forming a feed container, and screen carrying frame hinged at their outer edges to the upper edges of the side walls of the casing with the inner edges resting on the ledges, said screen frames covering the openings at the top of the casing.

DORA E. WARFEL.